United States Patent
Lam et al.

(10) Patent No.: US 6,826,014 B2
(45) Date of Patent: Nov. 30, 2004

(54) WRITE HEAD HAVING FIRST POLE PIECE WITH FREQUENCY DEPENDENT VARIABLE EFFECTIVE THROAT HEIGHT

(75) Inventors: Quan-chiu Harry Lam, San Jose, CA (US); Wen-chien David Hsiao, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 09/965,368

(22) Filed: Sep. 26, 2001

(65) Prior Publication Data

US 2003/0058583 A1 Mar. 27, 2003

(51) Int. Cl.[7] .................................................. G11B 5/31
(52) U.S. Cl. ............................................................ 360/126
(58) Field of Search .................................. 360/317, 126

(56) References Cited

U.S. PATENT DOCUMENTS

| | | | |
|---|---|---|---|
| 6,043,960 A | 3/2000 | Chang et al. ............... | 360/126 |
| 6,091,582 A | 7/2000 | Komuro et al. ............. | 360/126 |
| 6,104,576 A | 8/2000 | Santini ....................... | 360/126 |
| 6,122,144 A | 9/2000 | Chang et al. ............... | 360/122 |
| 6,137,652 A * | 10/2000 | Ezaki et al. ................ | 360/317 |
| 6,252,748 B1 * | 6/2001 | Yamanaka et al. .......... | 360/317 |
| 6,407,885 B1 * | 6/2002 | Ahagon et al. ............. | 360/126 |
| 6,452,743 B1 * | 9/2002 | Sasaki ........................ | 360/126 |
| 6,490,127 B1 * | 12/2002 | Sasaki ........................ | 360/126 |
| 6,624,971 B1 * | 9/2003 | Sasaki ........................ | 360/126 |
| 2003/0021064 A1 * | 1/2003 | Ohtomo et al. ............. | 360/126 |
| 2003/0128480 A1 * | 7/2003 | Saitho et al. ............... | 360/317 |

* cited by examiner

*Primary Examiner*—David L. Ometz
(74) *Attorney, Agent, or Firm*—Ervin F. Johnston

(57) ABSTRACT

A write head has a variable throat height wherein the throat height is dependent upon the frequency of operation of the write head. At high frequency operation the throat height is small and at low frequency operation the throat height is large. The write head writes hard into a circular track of a rotating magnetic disk at all frequencies but not overly hard at low frequencies thereby avoiding excessive erase bands and adjacent track interference (ATI) on each side of the track being written.

24 Claims, 10 Drawing Sheets

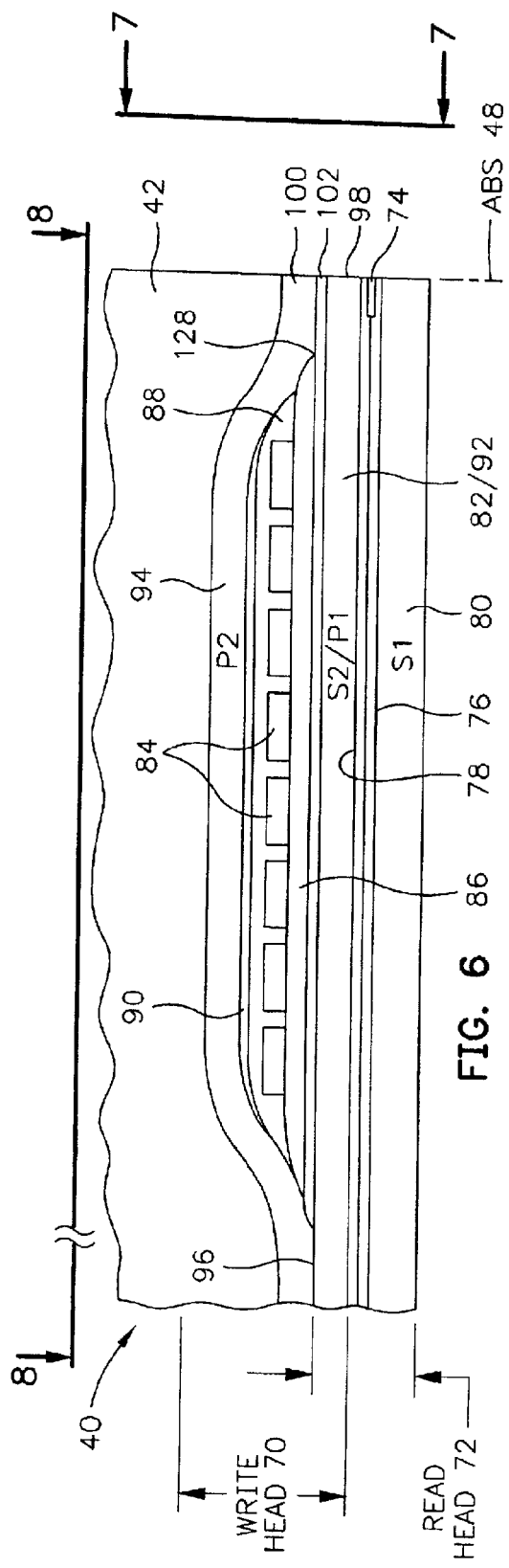
FIG. 6
FIG. 7
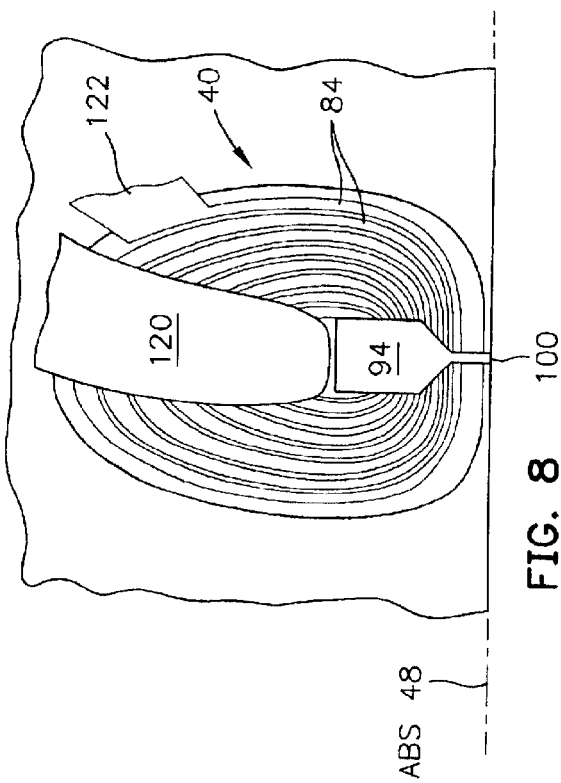
FIG. 8

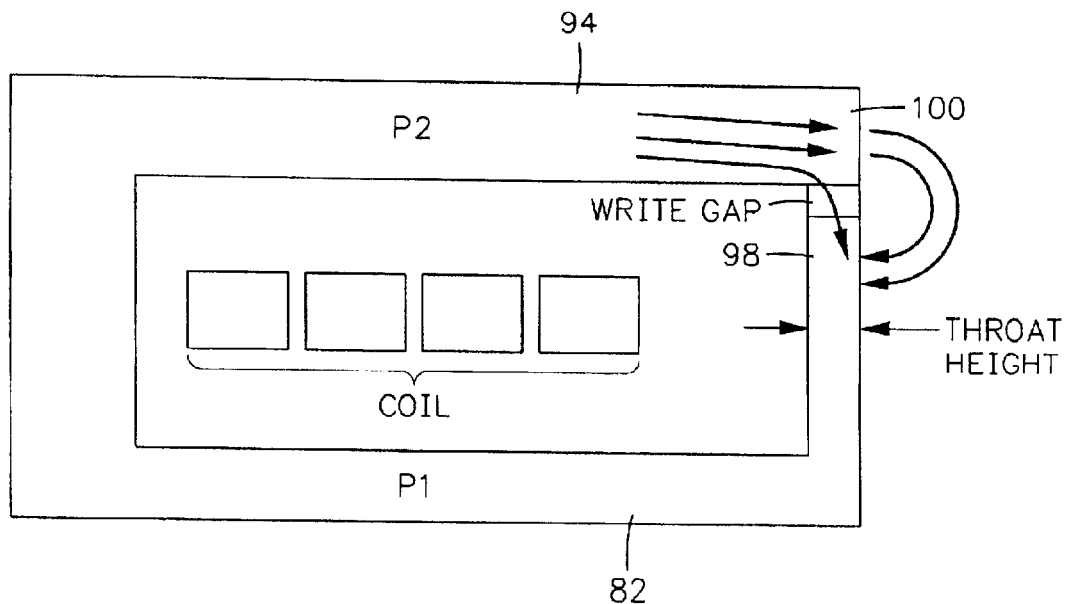
FIG. 21 (PRIOR ART – HIGH FREQUENCY)
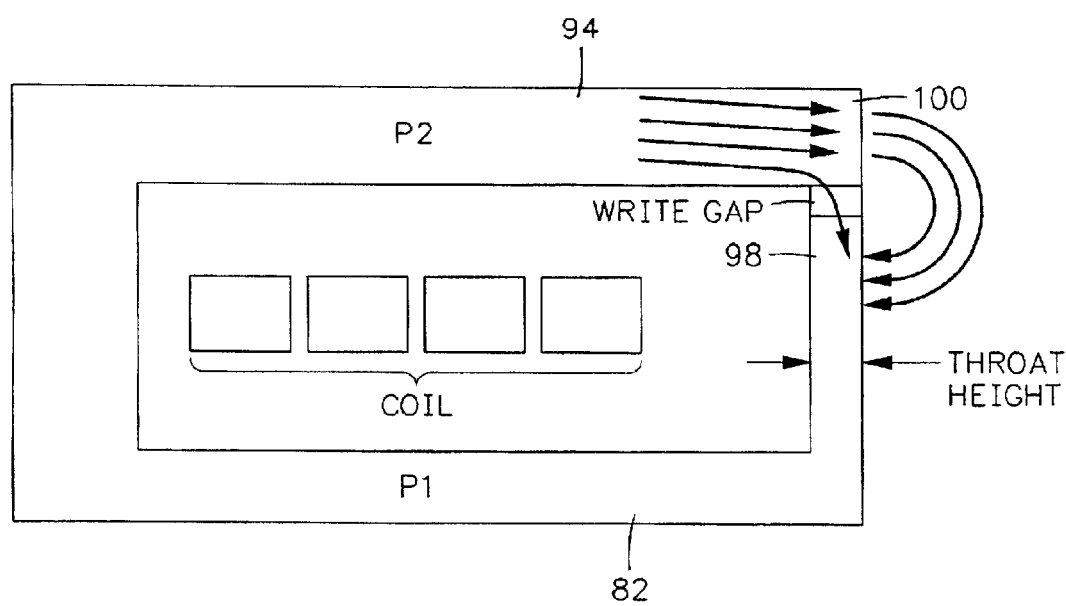
FIG. 22 (PRIOR ART – LOW FREQUENCY)

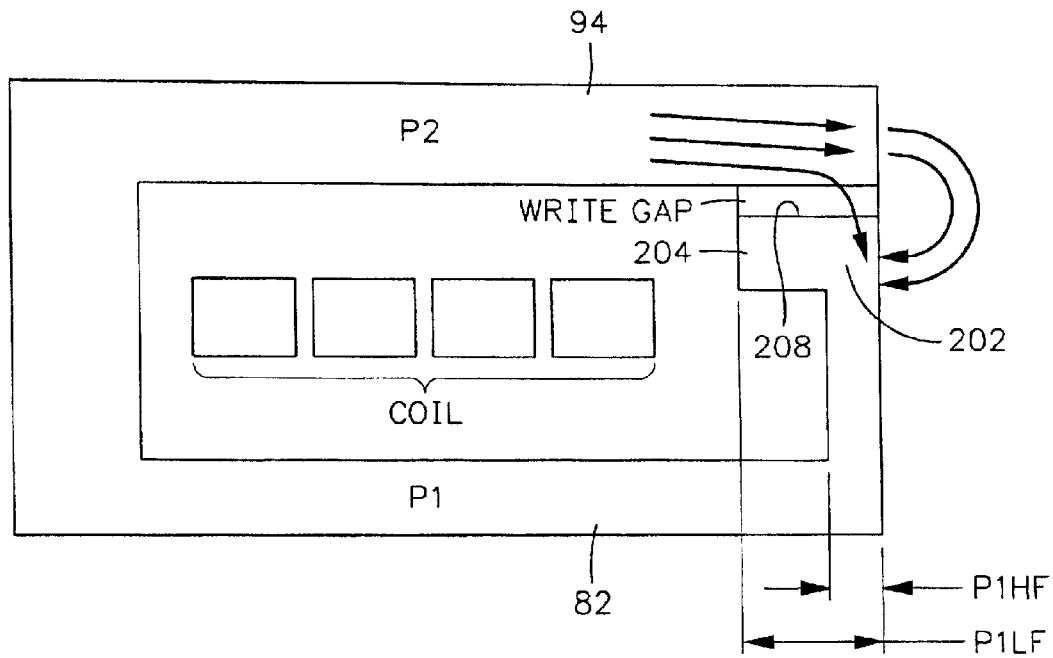
FIG. 23 (HIGH FREQUENCY)
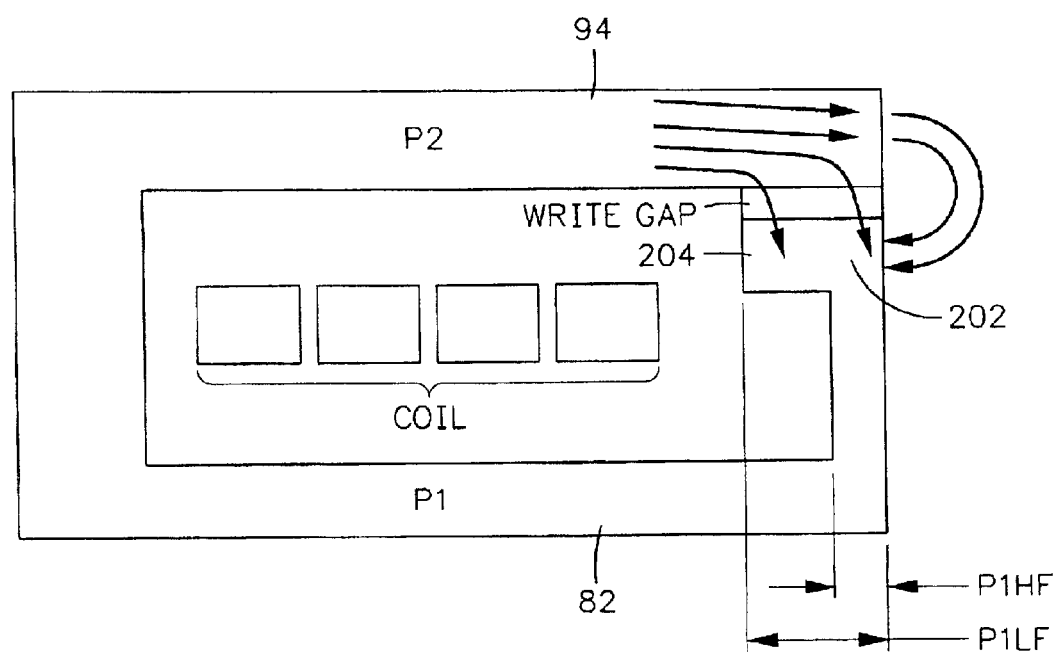
FIG. 24 (LOW FREQUENCY)

WRITE HEAD HAVING FIRST POLE PIECE WITH FREQUENCY DEPENDENT VARIABLE EFFECTIVE THROAT HEIGHT

BACKGROUND OF THE INVENTION

1. Field of the Invention

The present invention relates to a write head having a first pole piece with a frequency dependent variable effective throat height and, more particularly, to a high data rate write head which writes well (hard) within a track without overwriting adjacent tracks.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm urges the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic field signals from the rotating disk. The read and write heads are connected to processing circuitry that operates according to a computer program to implement the writing and reading functions.

A write head typically employs ferromagnetic first and second pole pieces which are capable of carrying flux signals for the purpose of writing the magnetic impressions into the track. Each of the first and second pole pieces has a pole tip, a yoke and a back gap with the yoke being located between the pole tip and the back gap. The pole tips are located at the ABS and the back gaps are magnetically connected at a recessed location within the write head. At least one coil layer is embedded in an insulation stack between the yokes of the first and second pole pieces. A nonmagnetic write gap layer is located between the pole tips. Processing circuitry digitally energizes the write coil which induces flux signals into the first and second pole pieces. The flux signals bridge across the write gap layer at the ABS so as to write the aforementioned magnetic impressions or bits into the track of the rotating disk. The thinner the thickness of the write gap layer, the greater the number of bits the write head can write into the track.

The first and second pole pieces are typically fabricated by frame plating. Photoresist is employed to provide the frame and a seed layer is employed to provide a return path for the plating operation. A typical sequence for fabricating a pole piece is to sputter clean the wafer, sputter deposit a seed layer, such as nickel iron, on the wafer, spin a layer of photoresist on the wafer, light-image the photoresist layer through a mask to expose areas of the photoresist that are to be removed (assuming that the photoresist is a positive photoresist), develop the photoresist to remove the light-exposed areas to provide an opening in the photoresist and then plate the pole piece in the opening up to a desired height.

The magnetic moment of each pole piece is parallel to the ABS and to the major planes of the layers of the write head. When the write current is applied to the coil of the write head the magnetic moment rotates toward or away from the ABS, depending upon whether the write signal is positive or negative. When the magnetic moment is rotated from the parallel position, the aforementioned magnetic flux fringes across the write gap layer between the first and second pole pieces impressing a positive or negative bit in the track of the rotating magnetic disk. As the write current frequency is increased the linear bit density is also increased. An increase in the linear bit density is desirable in order to increase the aforementioned areal density which provides a computer with increased storage capacity.

A write head is typically rated by its areal density which is a product of its linear bit density and its track width density. The linear bit density, which is dependent on the thickness of the write gap layer and the data rate of the write head, is the number of bits which can be written per linear inch along the track of the rotating magnetic disk and the track width density, which is dependent on the track width of the write head, is the number of tracks that can be written per inch along a radius of the rotating magnetic disk. The linear bit density is quantified as bits per inch (BPI) and the track width density is quantified as tracks per inch (TPI). Efforts over the years to increase the areal density of write heads have resulted in computer storage capacities which have increased from kilobytes to megabytes to gigabytes.

Efforts still continue to obtain higher BPI and TPI in order to improve the areal density of a write head. The throat height of a write head plays a key role in obtaining a desirable BPI and a desirable TPI. The throat height of a write head is the length of a pole tip portion of a first or second pole piece of the write head from the ABS to a recessed location within the head where the first and second pole pieces commence to separate after the ABS. The recessed location is referred to in the art as the zero throat height (ZTH). The greater the throat height the better the TPI and the less the throat height the better the BPI. The reason for this is because the write signals of the write head vary in frequency. For instance, if a write head is writing a series of ones into the track of a rotating magnetic disk the write signals are at the highest frequency, if a one is followed by one or more zeroes the frequency is lower and if the write signal is DC, for the purpose of erasing a track, the write signal is at the lowest frequency. When the write frequency is high the permeability of the magnetic material of the pole pieces is low and has high reluctance and when the write frequency is low the magnetic material has high permeability and low reluctance.

Assuming that the write head is designed only for the purpose of effectively writing high frequency write signals, such as one gigabit (GB) per second, into the track of the rotating magnetic disk it is desirable that the throat height be short, such as 0.5 $\mu$m from the ABS to the ZTH. With this arrangement the write head can have a high data rate since the write signals are strong and can be easily read by the read head of the magnetic head assembly. Assuming that the write signal frequency of such a head is low, the write head will still effectively write well along the length of the track but will cause a problem on each side of the track. The write head will cause a large erase band and/or a high level of adjacent track interference (ATI) on each side of the track that is being written. This is caused by a large corner field which emanates from bottom corners of the second pole tip at the ABS. This corner field spreads outwardly from the track width (TW) and magnetically affects the areas on each side of the track being written. The thickness of the second pole tip at the ABS also contributes to adjacent track interference by overhanging adjacent tracks, especially at the outer track locations of the rotating magnetic disk. In essence, when the write head is designed for high data rates only, the write head becomes overly efficient at low frequency data rates causing too much flux to fringe between the first and second pole tips because not enough flux is being shunted between the first and second pole pieces.

Now assuming that the write head is designed to provide a small erase band and minimal adjacent track interference at low frequency, the throat height would be increased, such as to 1.5 μm from the ABS to the ZTH. Accordingly, when the write frequency is low there is more of the throat height to cause a shunting of the flux between the first and second pole pieces to prevent unacceptable erase bands and adjacent track interference on each side of the track being written. Unfortunately, the larger throat height of such a write head will not write as effectively, especially at high data rates, as the write head with the shorter throat height. This is because more flux is being shunted between the first and second pole pieces because of the longer throat height and less flux is bridging between the first and second pole tips at the ABS to write strongly or hard within the track being written.

The two assumptions described hereinabove demonstrate the dilemma in designing a throat height for a high data rate write head to obtain strong signals along the track being written while avoiding unacceptable erase bands and adjacent track interference on each side of the track being written.

SUMMARY OF THE INVENTION

The present invention overcomes the aforementioned problems by providing a uniquely shaped throat so that the effective throat height is a function of the frequency. The effective throat height is smaller at high frequency and the effective throat height is larger at low frequency. In the invention the pole tip portion of the first pole piece is configured with first and second components wherein the first component forms a portion of the ABS and the second component is recessed from the ABS and is magnetically connected to the first component. The second component has a width that is less than a width of the first component wherein the widths are parallel to the ABS and parallel to major thin film planes of the layers of the sensor. Accordingly, the second component is constricted with respect to the first component and has a higher efficiency roll-off than the first component, which means the flux carrying efficiency of the second component decreases as the write signal frequency increases. It can be assumed that the first component has a length into the head of 0.5 μm and the second component, which is an extension of the first component into the head, has a length of 1.0 μm which gives a total throat height of 1.5 μm. Assuming that the write signal frequency is high, the permeability of the second component degrades and is less capable of carrying flux to the write gap or shunting flux to the second pole piece layer. Accordingly, the effective throat height is 0.5 μm and since the first component is designed to carry the desired high write signal frequency the head will write well into the track being written without unacceptable erase bands and adjacent track interference on each side of the track being written. When the write signal frequency becomes low the permeability of the second component is high and the effective throat height is 1.5 μm. In this mode, more flux is shunted between the second component and the second pole piece so as to prevent an over-amount of flux at the write gap to prevent the aforementioned unacceptable erase band and adjacent track interference. Accordingly, with the present invention the strength of the field signals being written into the track of the rotating magnetic disk is substantially constant throughout the operating frequency range, without the problem of unacceptable erase bands and adjacent track interference on each side of the track being written.

An object of the present invention is to provide a throat for a first pole piece of a write head which has a frequency dependent variable throat height.

Another object is to provide a write head wherein the strength of the field signal being written into a circular track of a rotating magnetic disk is substantially constant over a large frequency range without unacceptable erase bands and adjacent track interference on each side of the track being written.

Other objects and attendant advantages of the invention will be appreciated upon reading the following description taken together with the accompanying drawings.

BRIEF DESCRIPTION OF THE DRAWINGS

FIG. 6 is a partial view of the slider and the present write head as seen in plane 6—6 of FIG. 2;

FIG. 7 is a partial ABS view of the slider taken along plane 7—7 of FIG. 6 to show the read and write elements of the magnetic head;

FIG. 8 is a view taken along plane 8—8 of FIG. 6 with all material above the coil layer and leads removed;

FIG. 21 is a longitudinal schematic illustration of a prior art write head being operated at high frequency;

FIG. 22 is the same as FIG. 21 except the write head is being operated at low frequency;

FIG. 23 is a longitudinal schematic illustration of the present write head being operated at a high frequency; and FIG. 24 is the same as FIG. 23 except the write head is being operated at a low frequency.

DESCRIPTION OF THE PREFERRED EMBODIMENTS

Magnetic Disk Drive

Figure 1:
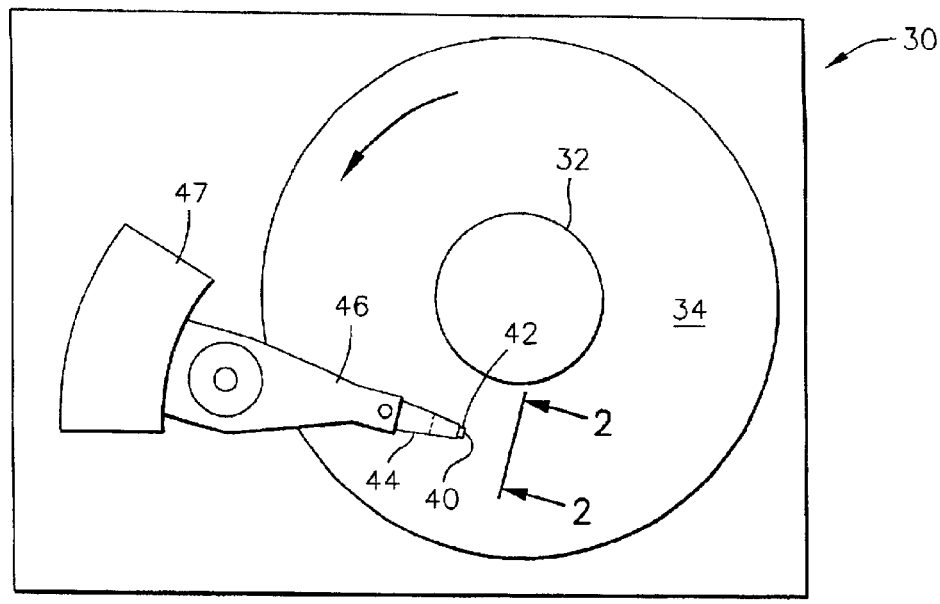
FIG. 1 is a plan view of an exemplary prior art magnetic disk drive.
Figure 2:
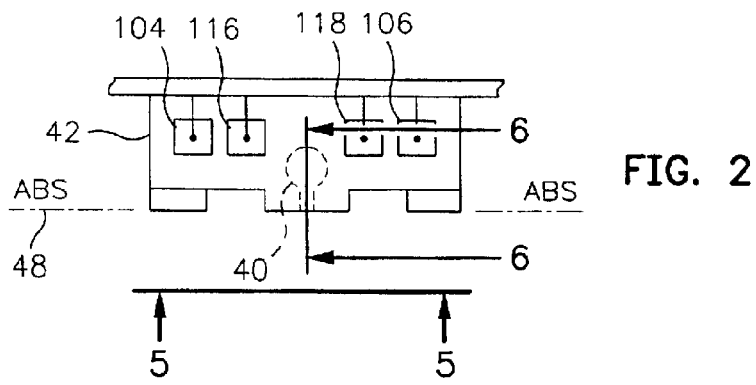
FIG. 2 is an end view of a prior art slider with a magnetic head of the disk drive as seen in plane 2—2 of FIG. 1.
Figure 3:
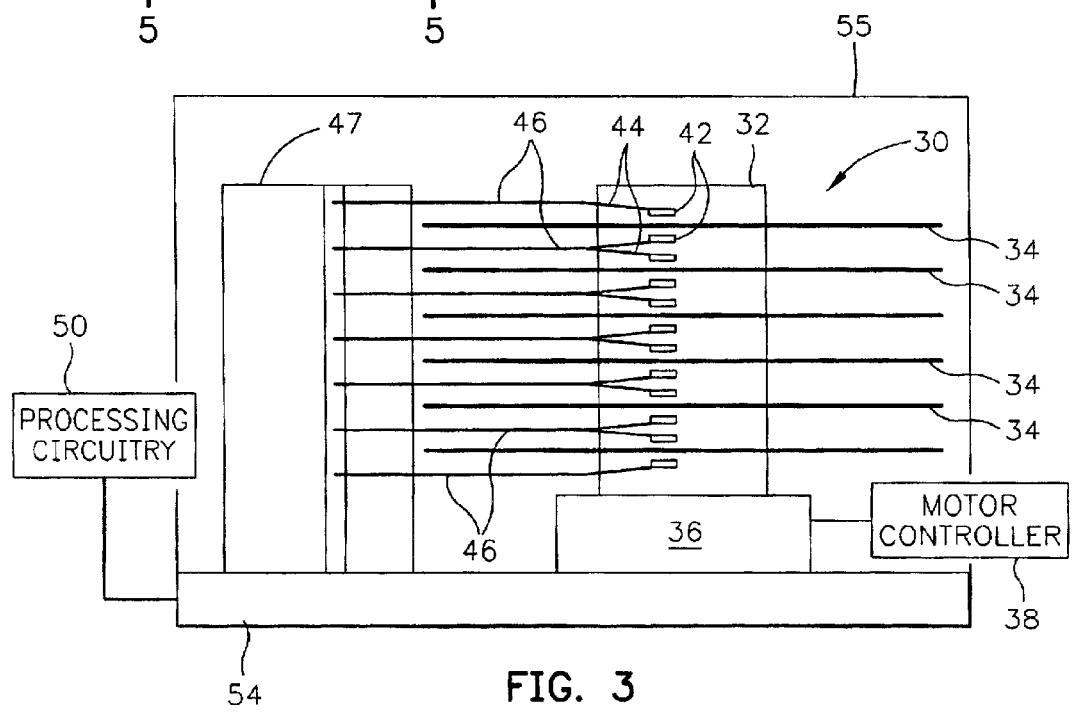
FIG. 3 is an elevation view of the prior art magnetic disk drive wherein multiple disks and magnetic heads are employed.
Figure 4:
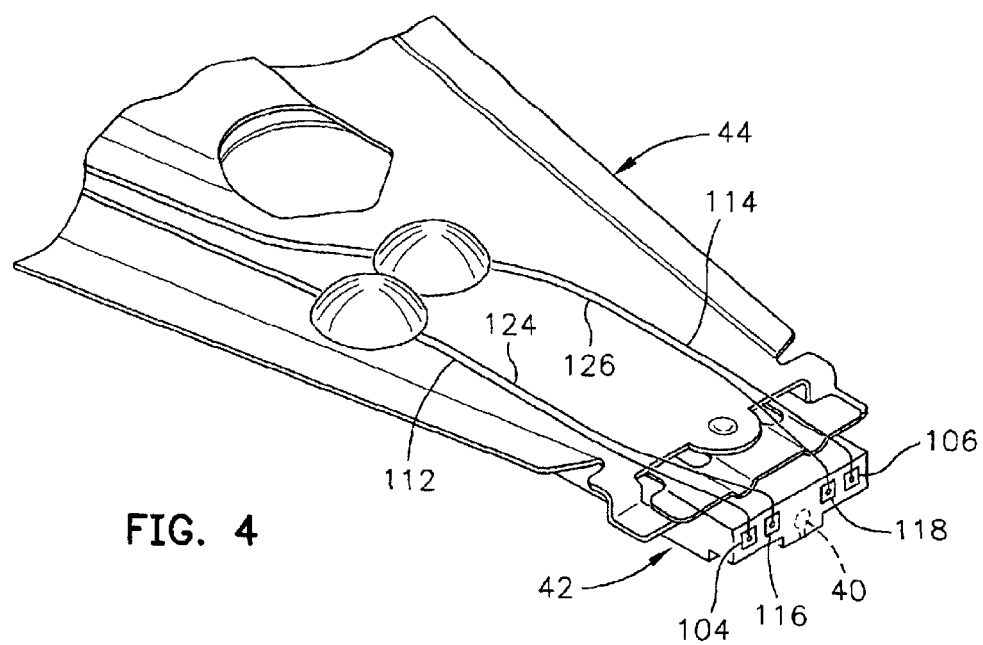
FIG. 4 is an isometric illustration of an exemplary prior art suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.01 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
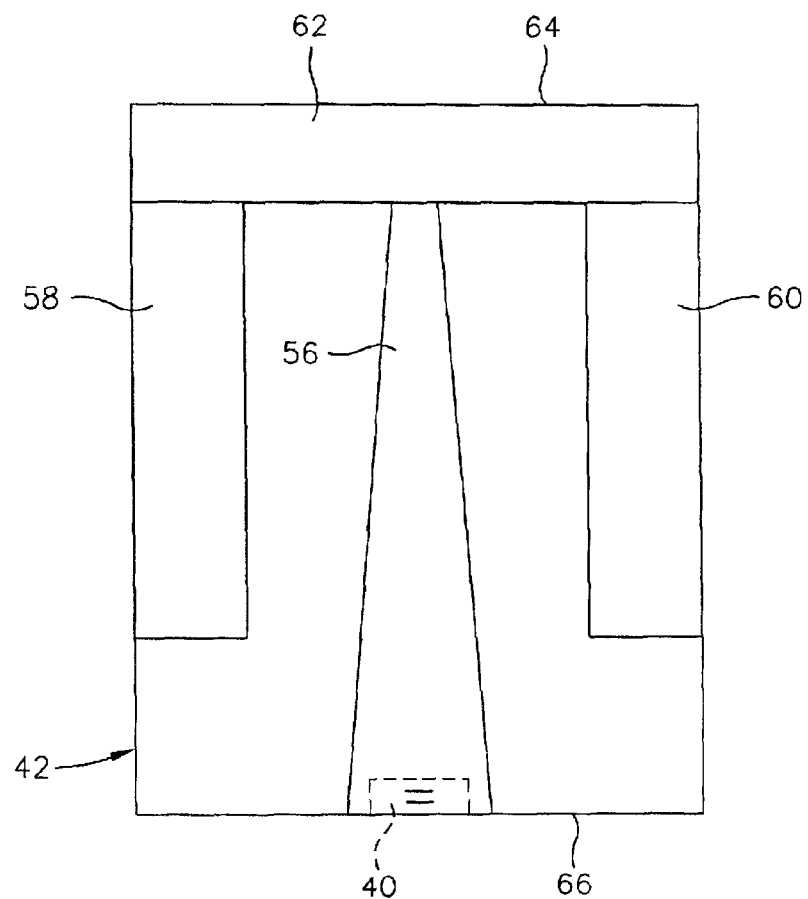
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

FIG. 6 is a side cross-sectional elevation view of a merged magnetic head assembly 40, which includes a write head portion 70 and a read head portion 72, the read head portion employing a read sensor 74. FIG. 7 is an ABS view of FIG. 6. The sensor 74 is sandwiched between nonmagnetic electrically nonconductive first and second read gap layers 76 and 78, and the read gap layers are sandwiched between ferromagnetic first and second shield layers 80 and 82. In response to external magnetic fields, the resistance of the sensor 74 changes. A sense current $I_S$ conducted through the sensor causes these resistance changes to be manifested as potential changes. These potential changes are then processed as readback signals by the processing circuitry 50 shown in FIG. 3.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. Since the second shield layer 82 and the first pole piece layer 92 are a common layer this head is known as a merged head. In a piggyback head the second shield layer and the first pole piece layer are separate layers which are separated by a nonmagnetic layer. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

The zero throat height (ZTH) of a write head is the location where the first and second pole pieces first commence to separate from each other after the ABS. The zero throat height of the write head, shown in FIG. 6, is at 128. The distance between the ABS and the zero throat height 128 defines the throat of the write head. Assuming that this throat has been designed with a height between the ABS and the zero throat height 128, to optimize strong write signals into the circular track of a rotating magnetic disk at high (and low) write signal frequencies, there will be a corner field at each bottom corner of the second pole tip (P2) 100, as shown by the broken lines in FIG. 7, which will fringe beyond the track width and cause unacceptable erase bands and adjacent track interference on each side of the track being written at low frequencies. This is because at low frequencies the throat between the ABS and the ZTH 128 in FIG. 6 becomes highly permeable which causes less flux to be shunted between the first and second pole pieces 82 and 94 which, in turn, causes more flux to bridge across the gap at 102.

Figure 9:
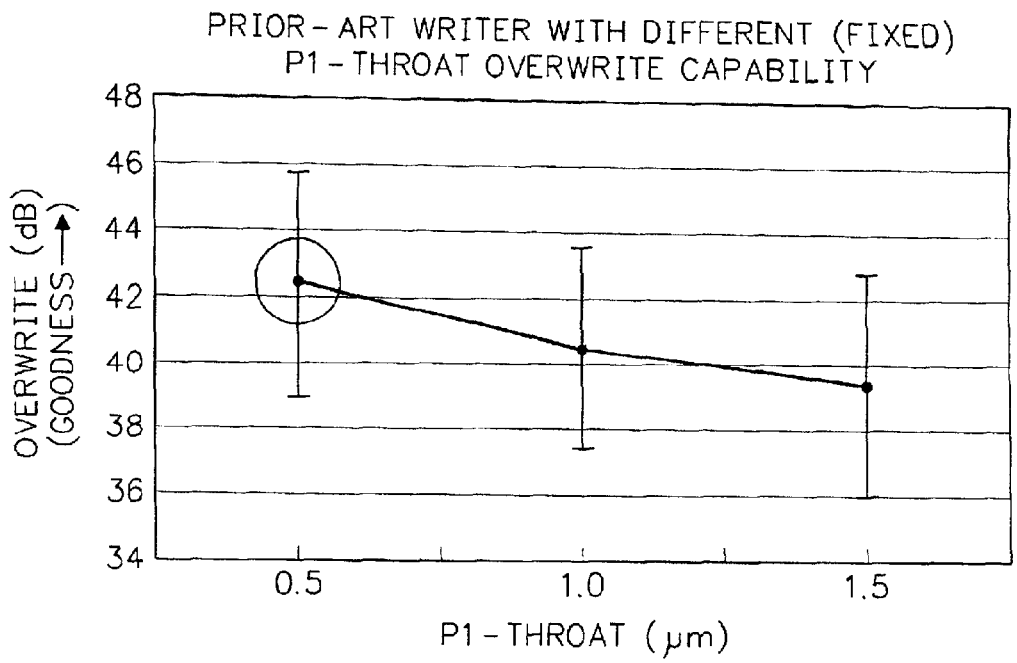
FIG. 9 is a graph illustrating that the over-write writability of a write head improves when the throat height is decreased.
Figure 10:
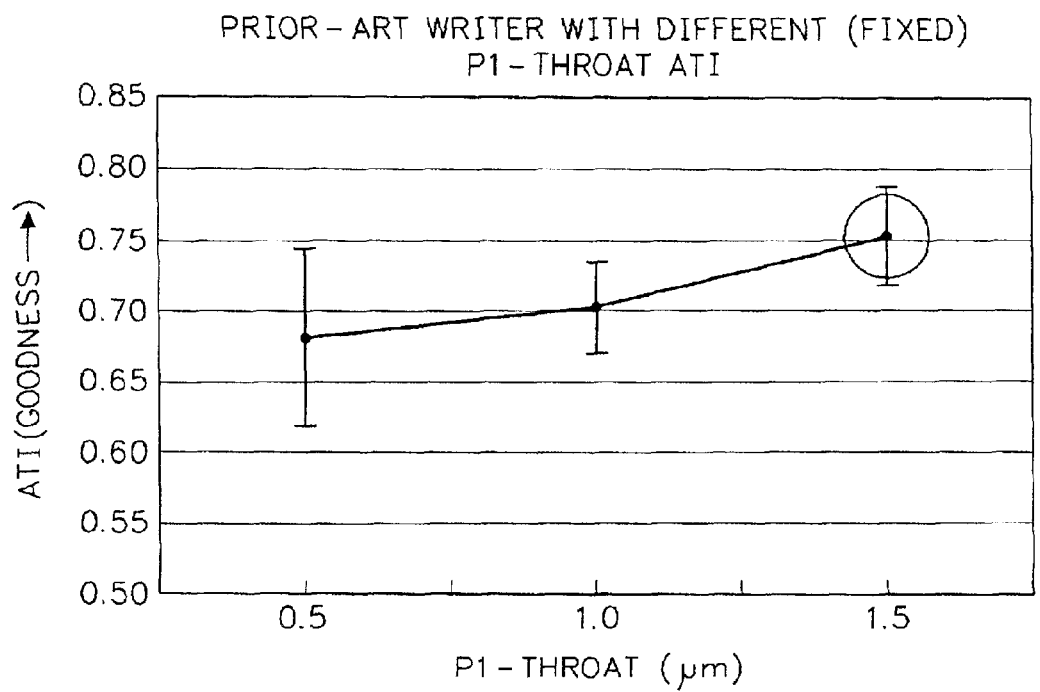
FIG. 10 is a graph illustrating that a write head causes less adjacent track interference when the throat height is increased.
Figure 11:
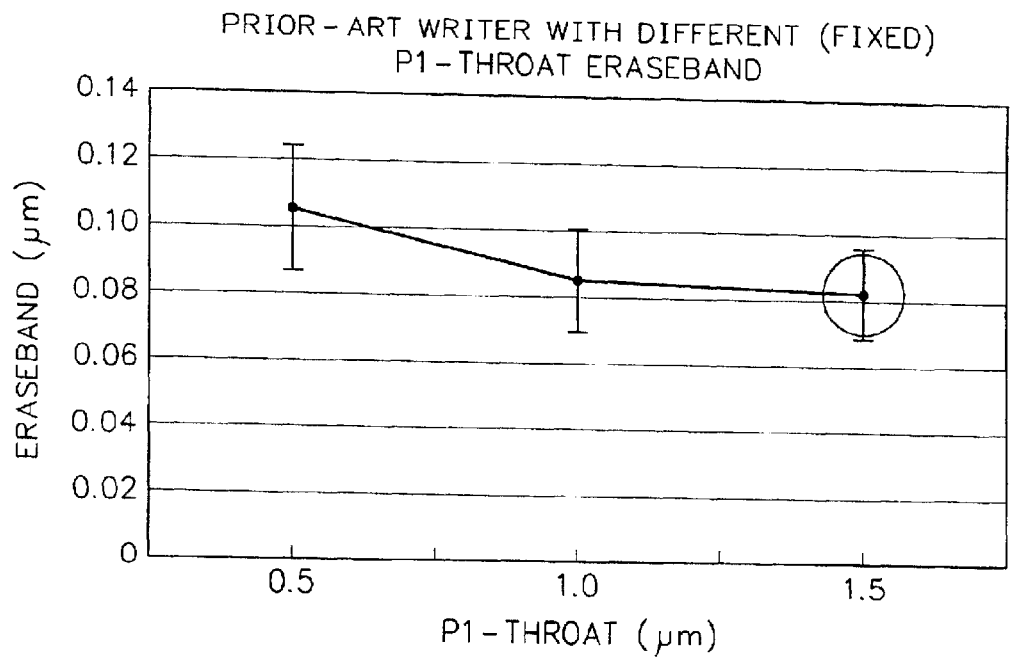
FIG. 11 is a graph showing that the erase band of a write head is less when the throat height is increased.
Figure 12:
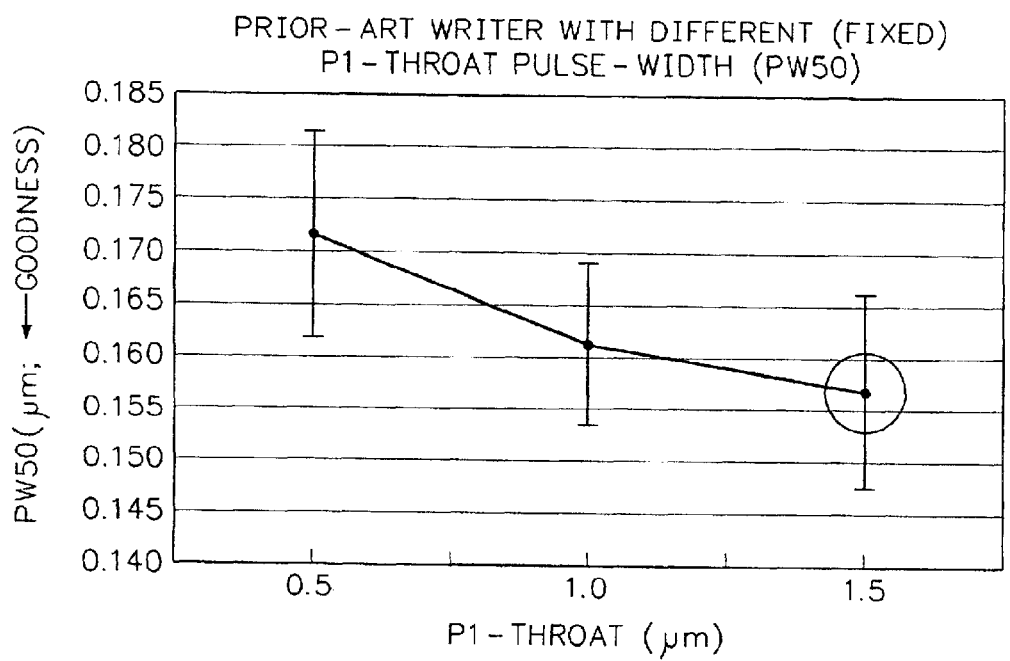
FIG. 12 is a graph showing the sharpness of the pulse being written by a write head is improved when the throat height is increased.

In FIGS. 9–12 tests were conducted on magnetic write heads with throat heights of 0.5 $\mu$m, 1.0 $\mu$m and 1.5 $\mu$m. FIG. 9 is a graph of the height of the throat in microns versus overwrite capability of the write head in decibals (db). It can be seen from the graph in FIG. 9 that the best overwrite capability is with a throat height of 0.5 $\mu$m which has a circle around it. FIG. 10 is a graph of the height of the throat in microns versus adjacent track interference (ATI). The lowest ATI is with a throat height of 1.5 $\mu$m which has been circled. FIG. 11 is a graph of the height of the first pole piece throat in microns versus the erase band in microns. It can be seen from FIG. 11 that the least erase band occurs when the throat height is 1.5 $\mu$m which has been circled. FIG. 12 is a graph of the height of the throat versus the width of a pulse measured at 50% level of its total height (PW50) in microns which is an indication of the sharpness of the pulse. It can be seen from FIG. 12 that the sharpest pulse occurs when the throat height is 1.5 $\mu$m which has been circled. Accordingly, from FIG. 9 it can be seen that a throat height of 0.5 $\mu$m is best for overwrite capability while from FIGS. 10–12 it can be seen that a throat height of 1.5 $\mu$m is best for low ATI, low erase band and a sharp pulse. FIGS. 9–12 show the conflicting design requirements when designing the write head shown in FIG. 6.

The Invention

Figure 13:
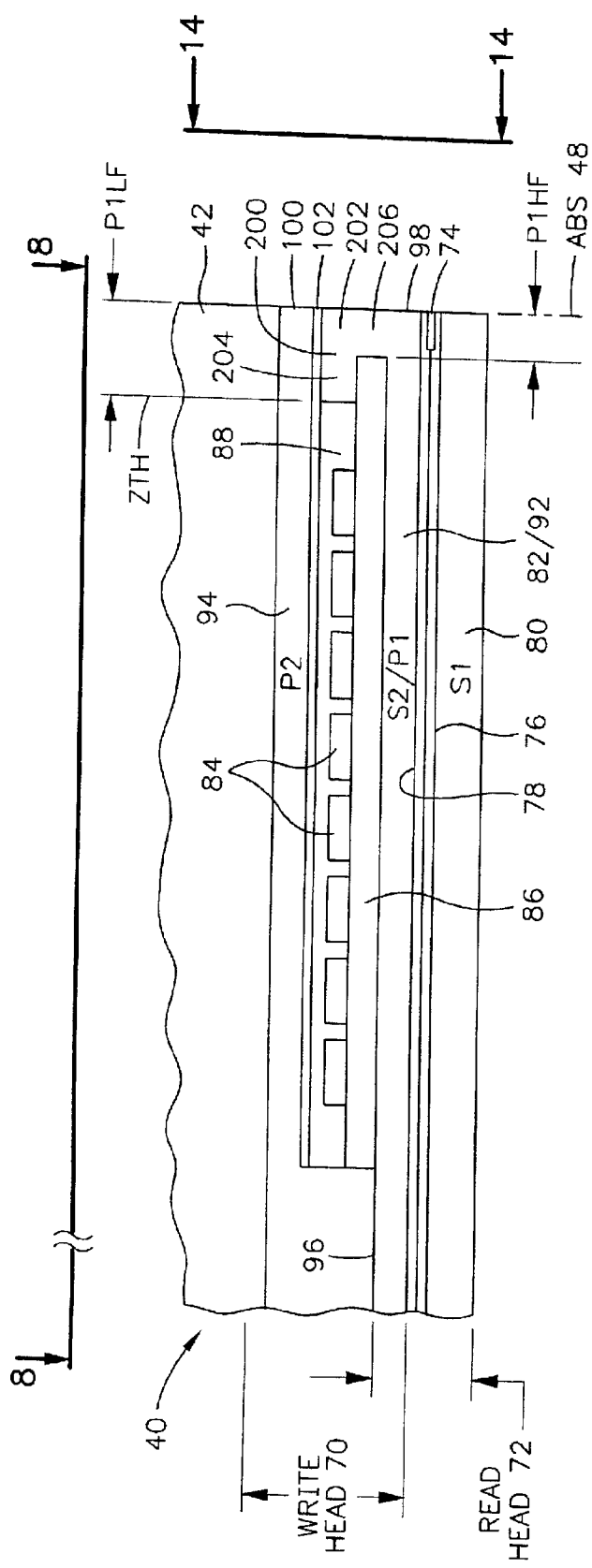
FIG. 13 is a longitudinal cross-sectional view of a magnetic head assembly employing the present write head.
Figure 14:
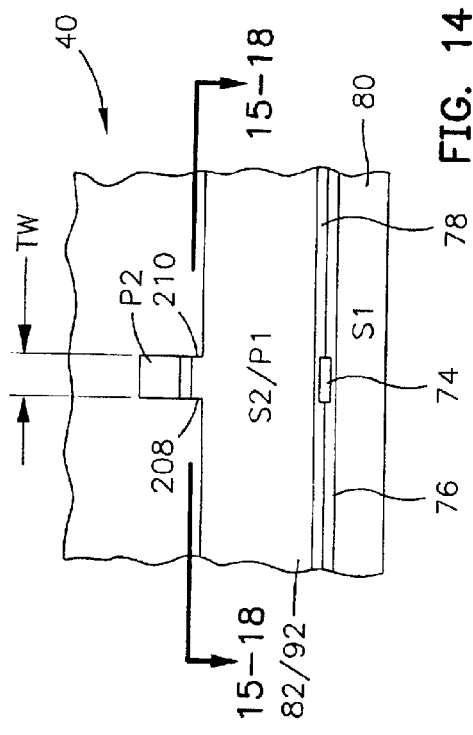
FIG. 14 is an ABS illustration taken along plane 14—14 of FIG. 13.

The present magnetic head assembly 40 is illustrated in FIG. 13 wherein the same or similar components have the same reference numerals as the reference numerals in FIG. 6. The present invention has a first pole piece (P1) throat 200 which extends from the ABS to a zero throat height (ZTH) which is recessed in the head and has first and second components 202 and 204 which are uniquely configured to provide a variable throat height and, consequently, a variable ZTH location which is dependent upon the write signal frequency. For instance, at high frequency the throat height is P1HF and at low frequency the throat height is P1LF. The unique shapes of the first and second components 202 and 204 will be described in detail hereinbelow. In a preferred embodiment a first pole piece (P1) pedestal 206 supports the first and second components 202 and 204 above a base portion of the first pole piece. Further, the first pole piece may be notched at 208 and 210, as seen in FIG. 14, for the purpose of promoting confinement of the fringing flux across the write gap layer 102 to the track width (TW).

Figure 15:
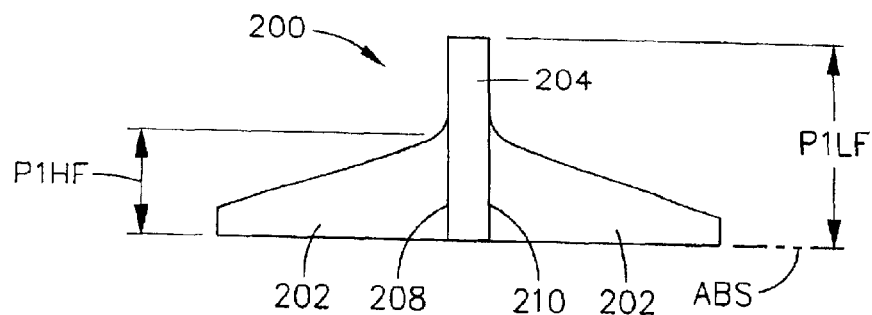
FIG. 15 is a view taken along plane 15—15 of FIG. 14.
Figure 16:
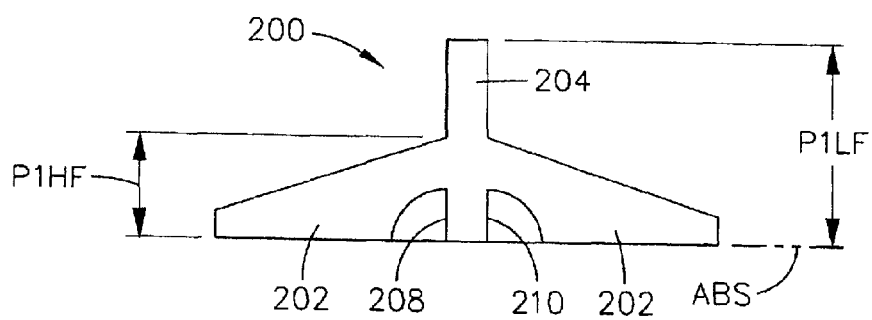
FIG. 16 is a view taken along plane 16—16 of FIG. 14.
Figure 17:
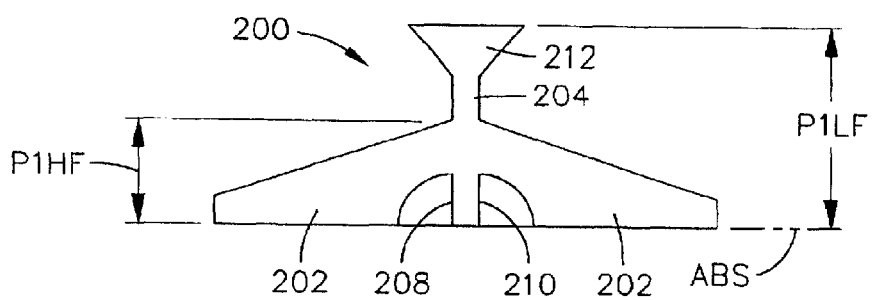
FIG. 17 is a view taken along plane 17—17 of FIG. 14.
Figure 18:
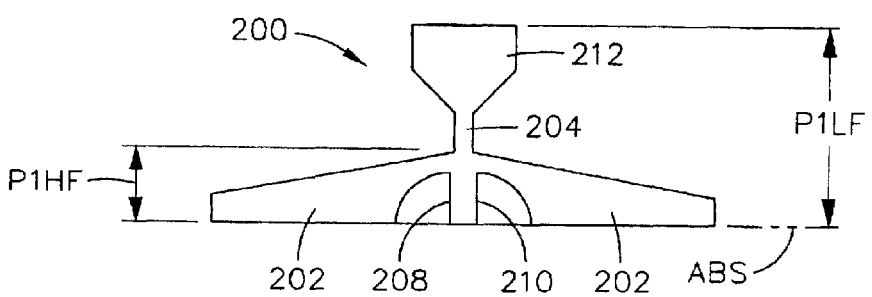
FIG. 18 is a view taken along plane 18—18 of FIG. 14.

Various embodiments of the configurations of the first and second components 202 and 204, as seen in a plane which is parallel to the major thin film planes of the magnetic head assembly, are illustrated in FIGS. 15–18. FIG. 15 illustrates the notching 208 and 210, as shown in FIG. 14, while FIGS. 16–18 show notching at 208 and 210 which is terminated closer to the track width (TW). FIG. 15 illustrates the first component 202 extending from the ABS to a recessed location P1HF and a second component 204 extending from the first component at P1HF to a location P1LF which is further recessed in the head and is located at the ZTH. The first component 202 has a large area on each side of the track width, which provides it with a wide width at the ABS and the second component 204 has a small area with a width which may be narrower than the track width (TW), slightly wider than the track width (TW) or equal to the track width (TW), as shown in FIG. 15. When the magnetic write head operates at low frequency the effective throat height is P1LF and when the write head operates at a high frequency the effective throat height is P1HF. For this reason the present invention is referred to as a write head which has a frequency dependent throat height. This is in contrast to the prior art wherein the throat height, whether it be the actual throat height or effective throat height, is constant regardless of the frequency. This variable throat height plays an important role in maintaining high writability of the write head at high frequency write operations while minimizing erase bands and adjacent track interference (ATI) at low frequency write operations, which will be explained in more detail hereinafter.

FIG. 16 is similar to FIG. 15 except it has notching 208 and 210 which are close to the ABS instead of a complete notching of the first component 202. At high frequency the effective throat height of the embodiment in FIG. 16 is at P1HF and at low frequency the effective throat height is P1LF. In FIG. 17 the first pole piece has a third component 212 with the second component 204 being located between the first and third components 202 and 212. The third component 212 is wider than the component 204 but narrower than the component 202. The third component 212 may be employed for moving the effective throat height location P1HF slightly behind the junction of the first and second components 202 and 204 during high frequency operation. During high frequency operation the permeability of the first component 202 has decreased slightly, the permeability of the third component 212 has decreased more than the first component 202 and the permeability of the second component 204 has decreased more than the third component 212. Accordingly, the effective throat height is slightly recessed in the embodiment shown in FIG. 17, as compared to the embodiments shown in FIGS. 15 and 16, and during low frequency operation of the write head will shunt more flux between the first and second pole pieces than the embodiments shown in FIGS. 15 and 16, provided the width of the second component 204 in FIG. 17 is the same as the widths of the second components 204 in FIGS. 15 and 16. FIG. 18 is the same as FIG. 17 except the second component 204 is narrower and the third component is larger with a slightly different shape to match the shape of the second pole tip 100 for optimum shunting at low frequency.

Figure 19:
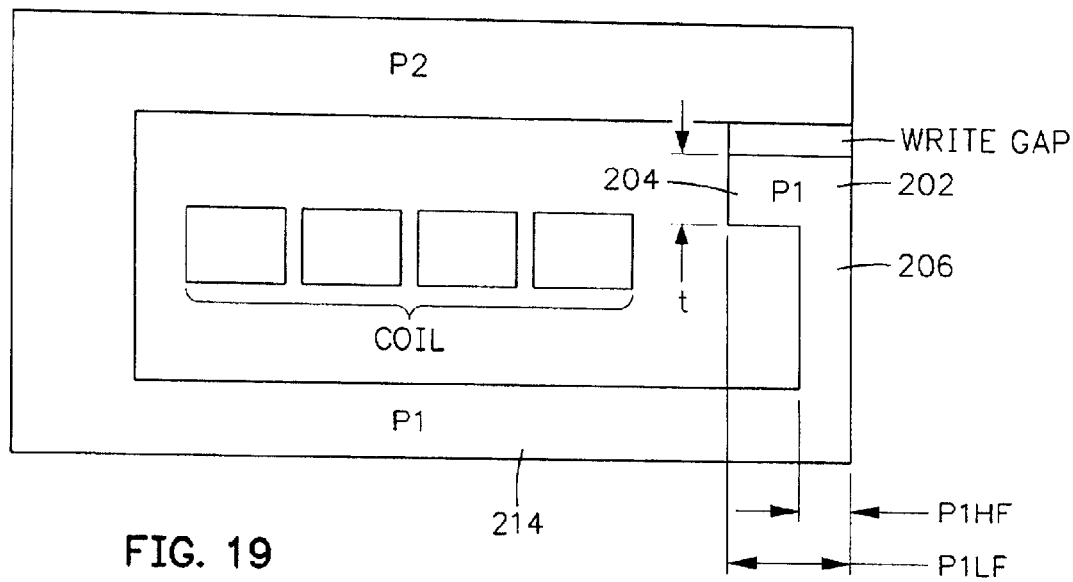
FIG. 19 is a longitudinal schematic illustration of the present invention.
Figure 20:
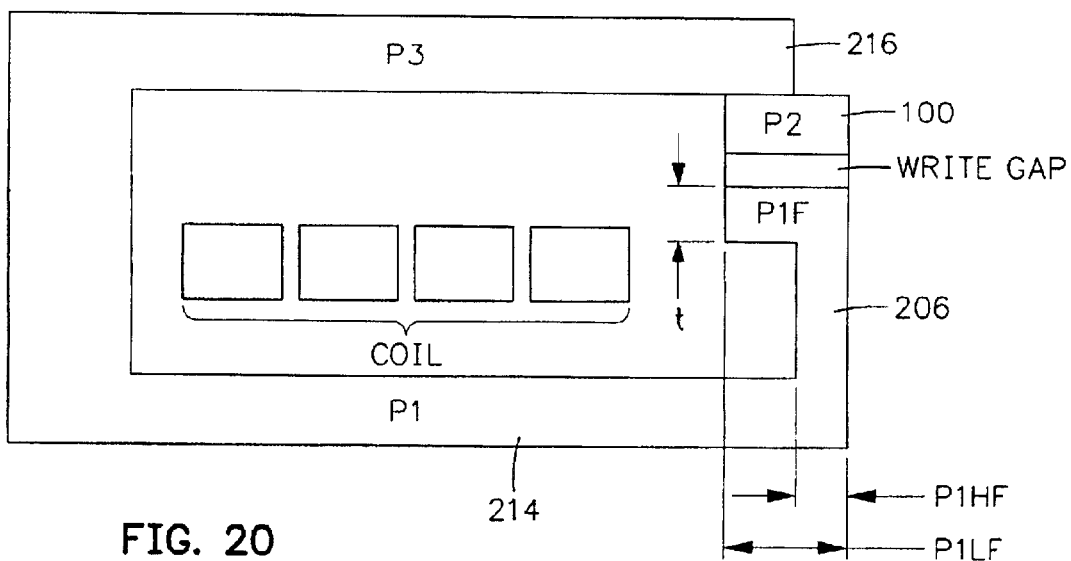
FIG. 20 is a longitudinal schematic illustration of another embodiment of the present invention.

FIG. 19 is a schematic illustration of the present invention showing the effective throat height P1HF during high frequency operation of the write head and the effective throat height P1LF during low frequency operation of the write head. While the first and second components 202 and 204 are supported by the pedestal 206 above a base portion 214 of the first pole piece layer, it should be understood that in a broad aspect of the present invention the first and second components 202 and 204 may be configured into the base portion 214 of the first pole piece layer with the second pole piece layer sloping downwardly and spaced therefrom by the write gap, similar to that shown in FIG. 6. FIG. 20 is a modification of FIG. 19 wherein a stitched second pole piece layer concept is employed wherein the second pole tip 100 is located at the ABS and a yoke component 216 of the second pole piece layer, labeled as P3, is stitched thereto at a recessed location. This design permits the second pole tip 100 to be more accurately configured.

FIGS. 21 and 22 are schematic illustrations of the operation of the prior art write head. FIG. 21 illustrates the operation of the prior art write head at high frequency. The write head in FIG. 21 has been designed for high frequency operation with a small throat height so that the write signal is written hard into the circular track of the rotating magnetic disk thereby meeting the demand of high data rate magnetic heads. Two magnetic flux lines are schematically illustrated as bridging the gap to write the high frequency data while one flux line is shunted between the second pole piece 94 and the first pole tip 98. The write head shown in FIG. 22 is the same as the write head shown in FIG. 21 and is therefore designed for high frequency operation. However, in FIG. 22 the write head is operating at low frequency. The second pole piece 94 is now conducting four flux lines instead of three because its permeability has increased due to the low frequency operation. The result is that three flux lines now bridge the gap at the ABS which is one more flux line bridging the gap than that shown in FIG. 21. One flux line still shunts between the second pole piece layer 94 and the first pole tip 98. It should be noted that the throat height (TH) is the same in FIGS. 21 and 22. Because of the extra amount of flux bridging the gap in FIG. 22, excessive flux emanates from the bottom corners of the second pole tip at the ABS to the first pole piece 78, as shown in FIG. 7, which causes erase bands and adjacent track interference (ATI) on each side of the track being written.

FIGS. 23 and 24 show the present write head which has a frequency dependent variable throat because of the first and second components 202 and 204. At high frequency operation, as illustrated in FIG. 23, the effective throat height is P1HF with the second component 204 having a low permeability due to the high frequency operation. Two flux lines are shown bridging the gap for implementing high data rate operation while one flux line is shunted to the first component 202 because the first component 202 still has a relatively high permeability compared to the second component 204. It should be noted that the first component 202 will have a relatively high permeability regardless of whether the write head writes at high or low frequency because of the largeness of the first component 202. The write head in FIG. 24 is the same as the write head in FIG. 23 except the write head in FIG. 24 is operating at low frequency. During low frequency operation the effective throat height is P1LF. Because of the low frequency operation the second pole piece layer 94 now conducts four flux lines due to increased permeability. However, because at low frequencies the permeability of the second component 204 is also increased two flux lines are now shunted to the first and second components 202 and 204, which is one more than that shown in FIG. 23, and the same two flux lines bridge across the gap for writing hard field signals into the circular track of the rotating magnetic disk in the same manner as that shown in FIG. 23. Accordingly, the present invention enables a high data rate write head to write strong field signals into the circular disk of the rotating magnetic disk without causing erase bands or adjacent track interference (ATI) on each side of the track being written. This is possible because the throat height in the present invention varies as a function of the frequency of the write signal of the write head.

Discussion

It should be noted that the present invention promotes a constant efficiency, namely a constant strength of the write signal at the ABS, throughout the frequency range of the write head. It should also be noted that the permeabilities of the first and second components of the present invention decrease with increasing frequency, however, the decrease in permeability of the first component is negligible as compared to the decrease in permeability in the second component because the first component is significantly larger in size. Accordingly, the frequency roll-off is much higher on the second component. The present invention flattens the overall frequency roll-off of the write head efficiency. It should also be noted that the corner field is a function of the throat height, namely the longer the throat height the smaller the corner field. Finite-element models have shown that when the throat height is increased from 1.0 $\mu$m to 1.4 $\mu$m, the corner field decreases by about 12%. Such a trend has been confirmed with experimental data.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A magnetic head assembly having a head surface comprising:
   a write head including:
      ferromagnetic first and second pole pieces that have a yoke portion located between a pole tip portion and a back gap portion;
      a nonmagnetic write gap layer located between the pole tip portions of the first and second pole pieces;
      an insulation stack with at least one coil layer embedded therein located between the yoke portions of the first and second pole pieces:
      the first and second pole pieces being connected at their back gap portions;
      the pole tip portion of the first pole piece having non-overlapping first and second components wherein the first component forms a portion of the head surface and the second component is recessed from the head surface and is magnetically connected to the first component; and
   the first and second components having a height into the head assembly which is measured from a centerline that is perpendicular to said head surface;
   each of the first and second components being located along said centerline so that the centerline bisects each of the first and second components with the second component being an extension of the first component into the head assembly along the centerline;
   the second component having a width that is less than a width of the first component wherein said widths are parallel to the head surface and parallel to a major plane of the write gap layer;
   a read head; and
   the first pole piece being located between the read head and the second pole piece.

2. A magnetic head assembly as claimed in claim 1 further comprising:
   the first pole piece having a third component that is recessed from the head surface and that has a width that is parallel to the head surface and the major plane of the write gap layer;
   the second component interconnecting the first and third components; and
   the width of the third component being greater than the width of the second component.

3. A magnetic head assembly as claimed in claim 1 further comprising:
   the read head including:
      a read sensor;
      nonmagnetic electrically nonconductive first and second read gap layers;
      the read sensor being located between the first and second read gap layers;
      a ferromagnetic first shield layer; and
      the first and second read gap layers being located between the first shield layer and the first pole piece.

4. A magnetic head assembly as claimed in claim 3 further comprising:
   the first pole piece having a third component that is recessed from the ABS and has a width that is parallel to the head surface and a major plane of the write gap layer;
   the second component interconnecting the first and third components; and
   the width of the third component being greater than the width of the second component.

5. A magnetic head assembly having an air bearing surface (ABS) and comprising:
   a write head including:
      ferromagnetic first and second pole piece layers that have a yoke portion located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers;
      the first and second pole piece layers being connected at their back gap portions;
      the pole tip portion of the first pole piece layer having first and second components wherein the first component forms a portion of the ABS and the second component is recessed from the ABS and is magnetically connected to the first component;
      the second component having a width that is less than a width of the first component wherein said widths are parallel to the ABS and parallel to a major plane of the write gap layer;

the first pole piece layer having a third component that is recessed from the ABS and having a width that is parallel to the ABS and the major thin film plane of the write gap layer;

the second component interconnecting the first and third components;

the width of the third component being greater than the width of the second component;

the first pole piece layer having a base layer and a pedestal wherein the pedestal forms a portion of the ABS; and the pedestal interconnecting the base layer and the first component.

6. A magnetic head assembly having an air bearing surface (ABS) and comprising:

a write head including:

ferromagnetic first and second pole piece layers that have a yoke portion located between a pole tip portion and a back gap portion;

a nonmagnetic write gap layer located between the pole tip portions of the first and second pole piece layers;

an insulation stack with at least one coil layer embedded therein located between the yoke portions of the first and second pole piece layers;

the first and second pole piece layers being connected at their back gap portions;

the pole tip portion of the first pole piece layer having first and second components wherein the first component forms a portion of the ABS and the second component is recessed from the ABS and is magnetically connected to the first component;

the first and second components having a height into the head assembly which is measured from a centerline that is perpendicular to said ABS;

each of the first and second components being located alone said centerline so that the centerline bisects each of the first and second components with the second component being an extension of the first component into the head assembly along the centerline;

the second component having a width that is less than a width of the first component wherein said widths are parallel to the ABS and parallel to a major plane of the write gap layer;

the first pole piece layer having a third component that is recessed from the ABS and having a width that is parallel to the ABS and the major thin film plane of the write gap layer;

the second component interconnecting the first and third components;

the width of the third component being greater than the width of the second component;

the first pole piece layer having a base layer and a pedestal wherein the pedestal forms a portion of the ABS; and the pedestal interconnecting the base layer and the first component;

a read head including:

a read sensor;

nonmagnetic electrically nonconductive first and second read gap layers;

the read sensor being located between the first and second read gap layers;

a ferromagnetic first shield layer; and the first and second read gap layers being located between the first shield layer and the first pole piece layer.

7. A magnetic disk drive including at least one magnetic head assembly that has a head surface and that includes a write head and a read head, comprising:

the write head including:

ferromagnetic first and second pole pieces that have a yoke portion located between a pole tip portion and a back gap portion;

a nonmagnetic write gap layer located between the pole tip portions of the first and second pole pieces:

an insulation stack with at least one coil layer embedded therein located between the yoke portions of the first and second pole pieces:

the first and second pole pieces being connected at their back gap portions;

the pole tip portion of the first pole piece having non-overlapping first and second components wherein the first component forms a portion of the head surface and the second component is recessed from the head surface and is magnetically connected to the first component; and the first and second components having a height into the head assembly which is measured from a centerline that is perpendicular to said head surface;

each of the first and second components being located along said centerline so that the centerline bisects each of the first and second components with the second component being an extension of the first component into the head assembly along the centerline;

the second component having a width that is less than a width of the first component wherein said widths are parallel to the head surface and parallel to a major plane of the write gap layer;

the read head including:

a read sensor;

nonmagnetic electrically nonconductive first and second read gap layers;

the read sensor being located between the first and second read gap layers;

a ferromagnetic first shield layer; and the first and second read gap layers being located between the first shield layer and the first pole piece;

the first pole piece being located between the read head and the second pole piece;

a housing;

a magnetic disk rotatably supported in the housing;

a support mounted in the housing for supporting the magnetic head assembly with said head surface facing the magnetic disk so that the magnetic head assembly is in a transducing relationship with the magnetic disk;

a spindle motor for rotating the magnetic disk;

an actuator positioning means connected to the support for moving the magnetic head assembly to multiple positions with respect to said magnetic disk; and a processor connected to the magnetic head assembly, to the spindle motor and to the actuator positioning means for exchanging signals with the magnetic head assembly, for controlling movement of the magnetic disk and for controlling the position of the magnetic head assembly.

8. A magnetic disk drive as claimed in claim 7 further comprising:

the first pole piece layer having a third component that is recessed from the head surface and has a width that is parallel to the head surface and the major plane of the write gap layer;

the second component interconnecting the first and third components; and the width of the third component being greater than the width of the second component.

9. A magnetic disk drive including at least one magnetic head assembly that has an air bearing surface (ABS) and that includes a write head and a read head, comprising:

the write head including:
   ferromagnetic first and second pole piece layers that have a yoke portion located between a pole tip portion and a back gap portion;
   a nonmagnetic write gap layer located between the pole tip portions of the first and second pole piece layers;
   an insulation stack with at least one coil layer embedded therein located between the yoke portions of the first and second pole piece layers;
   the first and second pole piece layers being connected at their back gap portions;
   the pole tip portion of the first pole piece layer having first and second components wherein the first component forms a portion of the ABS and the second component is recessed from the ABS and is magnetically connected to the first component;
   the second component having a width that is less than a width of the first component wherein said widths are parallel to the ABS and parallel to a major thin film plane of the write gap layer;

the read head including:
   a read sensor;
   nonmagnetic electrically nonconductive first and second read gap layers;
   the read sensor being located between the first and second read gap layers;
   a ferromagnetic first shield layer;
   the first and second read gap layers being located between the first shield layer and the first pole piece layer;
   the first pole piece layer having a base layer and a Pedestal wherein the pedestal forms a portion of the ABS; and
   the pedestal interconnecting the base layer and the first component;

a housing;
a magnetic disk rotatably supported in the housing;
a support mounted in the housing for supporting the magnetic head assembly with said ABS facing the magnetic disk so that the magnetic head assembly is in a transducing relationship with the magnetic disk;
a spindle motor for rotating the magnetic disk;
an actuator positioning means connected to the support for moving the magnetic head assembly to multiple positions with respect to said magnetic disk; and
a processor connected to the magnetic head assembly, to the spindle motor and to the actuator positioning means for exchanging signals with the magnetic head assembly, for controlling movement of the magnetic disk and for controlling the position of the magnetic head assembly.

10. A magnetic disk drive as claimed in claim 9 further comprising:
   the first pole piece layer having a third component that is recessed from the ABS and has a width that is parallel to the ABS and the major thin film planes of the layers of the sensor;
   the second component interconnecting the first and third components; and
   the width of the third component being greater than the width of the second component.

11. A method of making a magnetic head assembly having a head surface comprising the steps of:
   making a write head including the steps of:
      forming ferromagnetic first and second pole pieces that have a yoke portion located between a pole tip portion and a back gap portion;
      forming a nonmagnetic write gap layer between the pole tip portions of the first and second pole pieces;
      forming an insulation stack with at least one coil layer embedded therein between the yoke portions of the first and second pole pieces;
      connecting the first and second pole pieces at their back gap portions;
      forming the pole tip portion of the first pole piece with non-overlapping first and second components wherein the first component forms a portion of the head surface and the second component is recessed from the head surface and is magnetically connected to the first component;
      forming the first and second components with a height into the head assembly which is measured from a centerline that is perpendicular to said head surface;
      forming each of the first and second components along said centerline so that the centerline bisects each of the first and second components with the second component being an extension of the first component into the head assembly along the centerline;
      forming the second component with a width that is less than a width of the first component wherein said widths are parallel to the head surface and parallel to a major plane of the write gap layer; and
      forming a read head with the first pole piece located between the read head and the second pole piece.

12. A method of making a magnetic head assembly as claimed in claim 11 further comprising the steps of:
   forming the first pole piece layer with a third component that is recessed from the head surface and with a width that is parallel to the head surface and the major plane of the write gap layer;
   forming the second component interconnecting the first and third components; and
   forming the width of the third component greater than the width of the second component.

13. A method of making a magnetic head assembly as claimed in claim 11 further comprising the steps of
   making the read head including the steps of:
      forming a read sensor;
      forming nonmagnetic electrically nonconductive first and second read gap layers with the read sensor located between the first and second read gap layers; and
      forming a ferromagnetic first shield layer with the first and second read gap layers located between the first shield layer and the first pole piece.

14. A method of making a magnetic head assembly as claimed in claim 13 further comprising the steps of:
   forming the first pole piece with a third component that is recessed from the head surface and with a width that is parallel to the head surface and the major plane of the write gap layer;
   forming the second component interconnecting the first and third components; and
   forming the width of the third component greater than the width of the second component.

15. A method of making a magnetic head assembly having an air bearing surface (ABS) and comprising the steps of:
  making a write head including the steps of:
    forming ferromagnetic first and second pole piece layers that have a yoke portion located between a pole tip portion and a back gap portion;
    forming a nonmagnetic write gap layer between the pole tip portions of the first and second pole piece layers;
    forming an insulation stack with at least one coil layer embedded therein between the yoke portions of the first and second pole piece layers;
    connecting the first and second pole piece layers at their back gap portions;
    forming the pole tip portion of the first pole piece layer with first and second components wherein the first component forms a portion of the ABS and the second component is recessed from the ABS and is magnetically connected to the first component; and
    forming the second component with a width that is less than a width of the first component wherein said widths are parallel to the ABS and parallel to a major thin film plane of the write gap layer;
    forming the first pole piece layer with a third component that is recessed from the ABS and with a width that is parallel to the ABS and the major thin film plane of the write gap layer;
    forming the second component interconnecting the first and third components;
    forming the width of the third component greater than the width of the second component;
    forming the first pole piece layer with a base layer and a pedestal wherein the pedestal forms a portion of the ABS; and
    forming the pedestal interconnecting the base layer and the first component.

16. A method of making a magnetic head assembly having an air bearing surface (ABS) and comprising the steps of:
  making a write head including the steps of:
    forming ferromagnetic first and second pole piece layers that have a yoke portion located between a pole tip portion and a back gap portion;
    forming a nonmagnetic write gap layer between the pole tip portions of the first and second pole piece layers;
    forming an insulation stack with at least one coil layer embedded therein between the yoke portions of the first and second pole piece layers;
    connecting the first and second pole piece layers at their back gap portions;
    forming the pole tip portion of the first pole piece layer with first and second components wherein the first component forms a portion of the ABS and the second component is recessed from the ABS and is magnetically connected to the first component; and
    forming the second component with a width that is less than a width of the first component wherein said widths are parallel to the ABS and parallel to a major thin film plane of the write gap layer;
    forming the first pole piece layer with a third component that is recessed from the ABS and with a width that is parallel to the ABS and the major thin film plane of the write gap layer;
    forming the second component interconnecting the first and third components;
    forming the width of the third component greater than the width of the second component;
    forming the first pole piece layer with a base layer and a pedestal wherein the pedestal forms a portion of the ABS; and
    forming the pedestal interconnecting the base layer and the first component;
  making a read head including the steps of:
    forming a read sensor;
    forming nonmagnetic electrically nonconductive first and second read gap layers with the read sensor located between the first and second read gap layers; and
    forming a ferromagnetic first shield layer with the first and second read gap layers located between the first shield layer and the first pole piece layer.

17. A magnetic head assembly having a head surface and comprising:
  a write head including:
    ferromagnetic first and second pole pieces that have a yoke portion located between a pole tip portion and a back gap portion;
    a nonmagnetic write gap layer located between said pole tip portions;
    an insulation stack with at least one coil layer embedded therein located between said yoke portions;
    the first and second pole pieces being connected at their back gap portions; and
    the pole tip portion of the first pole piece having a full portion and a reduced cross-section portion wherein the full portion forms a portion of the head surface and the reduced cross-section portion is located entirely within a region which is recessed from said head surface;
    the first and second portions having a height into the head assembly which is measured from a centerline that is perpendicular to said head surface;
    each of the first and second portions being located along said centerline so that the centerline bisects each of the first and second portions with the second portion being an extension of the first portion into the head assembly along the centerline;
  a read head; and
  the first pole piece being located between the read head and the second pole piece.

18. A magnetic head assembly as claimed in claim 17 further comprising:
  the read head including:
    a read sensor;
    nonmagnetic electrically nonconductive first and second read gap layers;
    the read sensor being located between the first and second read gap layers;
    a ferromagnetic first shield layer; and
    the first and second read gap layers being located between the first shield layer and the first pole piece.

19. A magnetic disk drive including at least one magnetic head assembly that has a head surface and that includes a write head and a read head, comprising:
  the write head including:
    ferromagnetic first and second pole pieces that have a yoke portion located between a pole tip portion and a back gap portion;
    a nonmagnetic write gap layer located between said pole tip portions;
    an insulation stack with at least one coil layer embedded therein located between said yoke portions;
    the first and second pole pieces being connected at their back gap portions; and the pole tip portion of the first pole piece having a full portion and a reduced cross-section portion wherein the full portion forms a portion of the head surface and the reduced cross-section portion is located entirely within a region which is recessed from said head surface;

the first and second portions having a height into the head assembly which is measured from a centerline that is perpendicular to said head surface;

each of the first and second portions being located along said centerline so that the centerline bisects each of the first and second portions with the second portion being an extension of the first portion into the head assembly along the centerline;

the read head including:
a read sensor;
nonmagnetic electrically nonconductive first and second read gap layers;
the read sensor being located between the first and second read gap layers;
a ferromagnetic first shield layer; and
the first and second read gap layers being located between the first shield layer and the first pole piece layer;

the first pole piece being located between the read head and the second pole piece;

a housing;

a magnetic medium supported in the housing;

a support mounted in the housing for supporting the magnetic head assembly with said head surface facing the magnetic medium so that the magnetic head assembly is in a transducing relationship with the magnetic medium; and a processor connected to the magnetic head assembly for exchanging signals with the magnetic head assembly.

20. A method of making a magnetic head assembly having a head surface and comprising the steps of:

making a write head including the steps of:
forming ferromagnetic first and second pole pieces with a yoke portion located between a pole tip portion and a back gap portion;
forming a nonmagnetic write gap layer between said pole tip portions;
forming an insulation stack with at least one coil layer embedded therein between said yoke portions;
connecting the first and second pole pieces at their back gap portions; and
forming the pole tip portion of the first pole piece with a full portion and with a reduced cross-section portion wherein the full portion forms a portion of the head surface and the reduced cross-section portion is located entirely within a region which is recessed from said head surface; and
forming the first and second portions with a height into the head assembly which is measured from a centerline that is perpendicular to said head surface;
forming each of the first and second portions along said centerline so that the centerline bisects each of the first and second portions with the second portion being an extension of the first portion into the head assembly along the centerline;
forming a read head with the first pole piece located between the read head and the second pole piece.

21. A magnetic head assembly that has a head surface comprising:

a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers;
the first and second pole piece layers being connected at their back gap portions;
the pole tip portion of the first pole piece layer having first and second components wherein the first component forms a portion of the head surface and the second component is recessed from the head surface and is magnetically connected to the first component;
the second component having a width that is less than a width of the first component wherein said widths are parallel to the head surface and parallel to a major thin film plane of the write gap layer;
the first pole piece layer having a base layer and a pedestal wherein the pedestal forms a portion of the head surface and is located between the head surface and the insulation stack; and
the pedestal interconnecting the base layer and the first component.

22. A magnetic head assembly as claimed in claim 21 further comprising:

a read head; and the first pole piece layer being located between the read head and the second pole piece layer.

23. A method of making a magnetic head assembly that has a head surface comprising the steps of:

making a write head including the steps of:
forming ferromagnetic first and second pole piece layers that have a yoke portion located between a pole tip portion and a back gap portion;
forming a nonmagnetic write gap layer between the pole tip portions of the first and second pole piece layers;
forming an insulation stack with at least one coil layer embedded therein located between the yoke portions of the first and second pole piece layers;
connecting the first and second pole piece layers at their back gap portions;
forming the pole tip portion of the first pole piece layer with first and second components wherein the first component forms a portion of the head surface and the second component is recessed from the head surface and is magnetically connected to the first component;
forming the second component with a width that is less than a width of the first component wherein said widths are parallel to the head surface and parallel to a major thin film plane of the write gap layer;
forming the first pole piece layer with a base layer and a pedestal wherein the pedestal forms a portion of the head surface and is located between the head surface and the insulation stack; and
forming the pedestal to interconnect the base layer and the first component.

24. A method as claimed in claim 23 further comprising the step of:

forming a read head with the first pole piece layer located between the read head and the second pole piece layer.

* * * * *